UNITED STATES PATENT OFFICE.

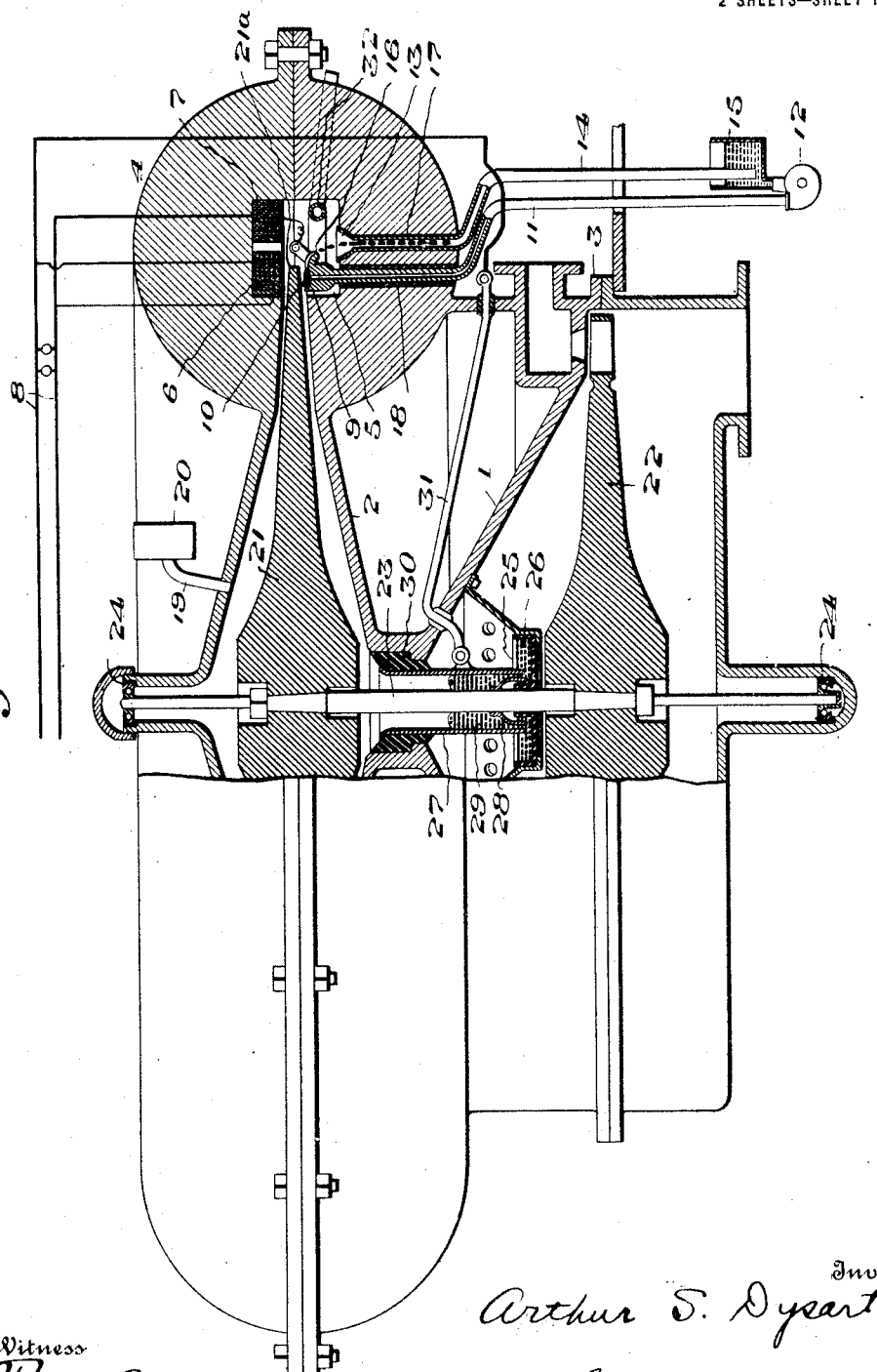

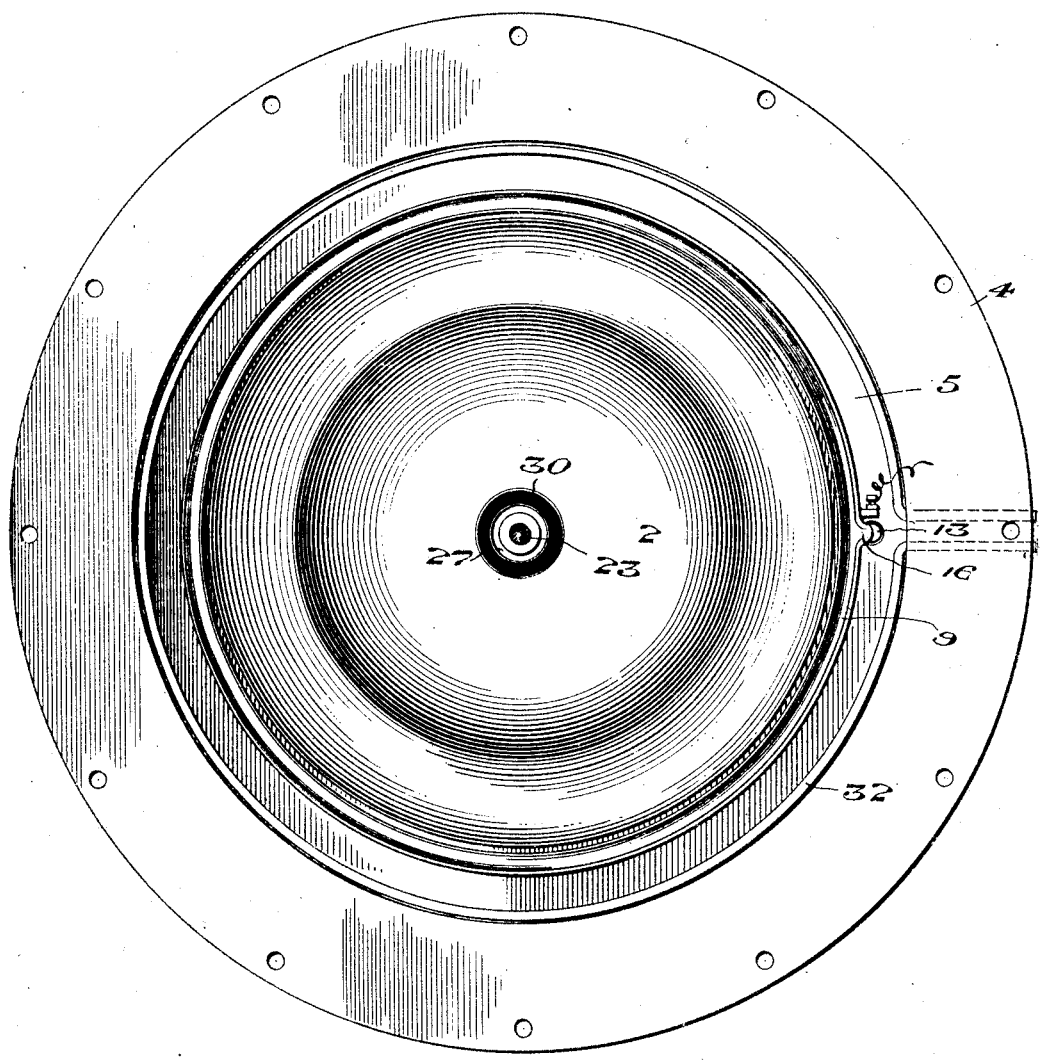

ARTHUR S. DYSART, OF THE UNITED STATES NAVY.

TURBINE-DRIVEN ELECTRIC GENERATOR.

1,255,589.   Specification of Letters Patent.   Patented Feb. 5, 1918.

Application filed December 21, 1916. Serial No. 138,182.

*To all whom it may concern:*

Be it known that I, ARTHUR S. DYSART, lieutenant, junior grade, in the United States Navy, a citizen of the United States, have invented certain new and useful Improvements in Turbine-Driven Electric Generators, of which the following is a specification.

The speed at which an impulse turbine operates is very high, from 1400 to 2000 feet peripheral speed, or higher, per second, of the rotor being common.

Use of the usual commutator or slip ring and brushes for collecting the current from the edge of a rotor disk having such a peripheral speed is impracticable.

My invention relates to a homopolar electric generator for impulse turbines and has for its object the provision of novel means for collecting the current from the rapidly revolving rotor or armature. My invention contemplates the use of a mercury vapor brush or collecting device and the employment of a relatively high vacuum in the generator casing, with other improvements and novel features appearing more fully hereinafter. The mercury vapor brush extends all the way around the edge of the armature and collects current from a rotor traveling at a peripheral speed of 2000 feet per second, or more, with an almost entire elimination of friction, permitting the generation of voltages as high as 500 volts by the use of a single armature disk; with an amperage of about 4 amperes per square inch of mercury vapor.

The generator casing is exhausted to a complete vacuum except for the mercury vapor therein contained. The casing will always contain mercury vapor as the invention contemplates a constantly exposed free mercury surface. The operation of the generator armature in a vacuum eliminates windage losses.

The invention is preferably carried out by the provision of a generator casing subject to vacuum producing means, a trough or container for the mercury, whose surface is juxtaposed to the peripheral portion of the armature disk or rotor, and means, such as a Sprengel air pump into whose funnel mouth the mercury is constantly falling in drops while the pump is in operation, the mercury drops entrapping a part of the mercury gas or vapor and carrying it off to a point where the weight of the mercury drops above the bubble of gas balances the pressure of the outside air. The entrained gas escapes into the atmosphere and the mercury is pumped back to the trough. It is not essential that a Sprengel pump be employed as any air pump would serve this purpose provided it can maintain a vacuum in the generator casing.

Preferably an auxiliary vacuum pump of higher capacity than the Sprengel pump, is used to initially exhaust the generator casing when the machine is started. The auxiliary pump may then be shut down.

Preferably the interior of the generator casing is provided with an insulating coat of any suitable material. Enamel, porcelain, or the like will serve this purpose. The armature disk or roter is also, preferably, coated, except at its periphery, with an insulating coating such as enamel. The coating of the generator casing will prevent grounding of any conductor to the casing through the surrounding mercury vapor and the coating on the armature will prevent its becoming short-circuited.

The armature shaft also carries the rotor of the impulse turbine. An improved mercury seal is provided to seal the generator casing from the turbine casing. The turbine casing will usually be subject to a more or less complete vacuum.

By using a pulsating direct current in the field windings of the homopolar generator, a pulsating direct current may be induced in the disk armature. By leading the pulsating armature current to the primary of a transformer, a true alternating current may be obtained from the secondary of the transformer. In such a case, the homopolar field magnet should be laminated to avoid the generation of eddy currents and radial slots should be provided in the armature disk to divide it into sectors to reduce the eddy currents in said disk.

My invention can, therefore, be utilized to produce either a direct or an alternating current.

The embodiment of the invention hereinafter set forth and shown in the accompanying drawings is to be considered as illustrative, rather than restrictive, of the scope of the invention, as modifications may be resorted to.

In the accompanying drawings:

Figure 1 is a sectional elevation, and

Fig. 2, a plan view, the armature and upper half of the generator casing having been removed.

The bottom half of the generator casing 2 is integral with the top half of the turbine casing 1.

The turbine shell or casing 1 and the generator shell or casing 2 are connected together in any suitable manner as, for instance, by the flanges 3. The respective shells or casings are of sectional form for facility of assembly, access to the interiors thereof, and for other obvious reasons.

The shell or casing 2 has an annular hollow field magnet 4 the halves of which are integral with the respective halves of the casing 2. The homopolar or uni-polar field thus provided may have internal mating annular cavities which, together, provide a space 5.

Within the upper portion of the space 5 are the annular shunt and series windings or coils 6 and 7, the former being in shunt on the leads 8 and the latter being in series therewith. Contained within the lower portion of the space or chamber 5 is an annular trough 9 which is adapted to contain mercury 10. The trough is in communication with a pipe 11 leading to a pump 12. Adjacent the trough 9 is the mouth or funnel 13 of the Sprengel pump 14 which leads to the mercury well or receiver 15 of said pump. The pump 12 returns mercury to the mouth of the Sprengel vacuum pump 14. A lip 16 permits the mercury 10 to travel over the trough 9 into the mouth 13. This action results in a series of drops indicated at 17. The mercury drops 17 entrap a part of the gas and carry it down the pipe 14 to a point where the weight of the mercury drops above the bubble of gas balances the pressure of the outside air. When the well 15 is reached, the mercury drops are caught and the entrained gas escapes to the atmosphere, the mercury being again pumped back through the pipe or tube 11 into the trough.

The Sprengel pump is well adapted to my invention but any form of air pump will serve the purpose provided it may maintain a vacuum in the generator shell or casing 2.

The trough 9 is electrically connected to the series coil 7. The tube or pipe 11 is insulated at 18 from the pole 4.

From any point in the generator casing 2 there leads a pipe or tube 19 to an auxiliary vacuum pump 20 of a higher capacity than the pump 14. The pump 20 is used at the starting of the generator and may be shut down as soon as a high initial vacuum is attained in the casing 2, after which the pump 14 will maintain the vacuum.

The disk armature 21 of the generator, and the rotor 22 of the impulse turbine, are secured to a common spindle 23 preferably mounted in ball bearings 24 (insulated from the casing) and being more or less flexible to permit the armature and rotor to revolve around their centers of gravity and thus render extremely accurate balancing unnecessary. The rotors 21, 22 are of hyperbolic section to adapt them to withstand the high centrifugal forces set up within them by reason of their rapid rotation. The interior of the generator casing 2 should be insulated in any suitable manner as, for instance, by enamel or porcelain and the rotor or armature 21 should also be insulated with strongly adhesive enamel such as will not be thrown off by centrifugal action. The peripheral portion 21$^a$ of the rotor is left uninsulated and runs close to the trough 9 and mercury 10. The rotor 22 and bearings 24 should be electrically insulated from the casing because the spindle 23 carries the current.

There is a more or less complete vacuum in the turbine casing 1 depending on the efficiency of the condenser to which the turbine is connected.

An annular, shallow, vessel 25 of insulating material and containing mercury 26, surrounds the spindle 23 and is suitably secured to the casing 1. An iron tube or sleeve 27 has its lower end immersed in the mercury 26. Secured on the shaft 23 is a petticoat 28 which lies within the sleeve or tube 27 and has its lower end immersed in the mercury 26. This petticoat closely fits the spindle 23 and prevents the mercury 29 which is contained within the tube 27 from running into the turbine casing. The mercury column 29 is supported by the pressure of the mercury bed 26. A complete seal is thus obtained between the casings 1 and 2. The tube 27 may be secured to the casing 2, but insulated therefrom, in any suitable manner, as at 30.

The vacuum prevailing in the turbine casing 1 permits the employment of a relatively short tube 27. If no vacuum prevailed in the casing 1, a very long tube 27 would have to be employed to contain the height of the mercury column due to atmospheric pressure.

A bus-bar or any other suitable conductor 31, insulated from the casing, is electrically connected to the tube 27 and to the remaining lead 8.

The generator having been started the auxiliary air pump 20 may be used to initiate the vacuum and then stopped, the vacuum being maintained by the pump 14. The rotor or armature disk 21 operates in a vacuum of about 1 mm. of mercury pressure and is therefore surrounded by mercury vapor at 1 mm. pressure. Being an excellent conductor of electricity, the mercury vapor serves as a brush or current collector which takes off the current from the armature 21 around the entire periphery thereof inasmuch as the trough 9 is annular and the exposed mercury 10 is of corresponding form. Impulse turbines operate at a peripheral speed of 1400 to 2000 feet or more per second which prevents the use of the ordinary mechanical brush or collector which would have to actually make contact with the edge of the disk. The mercury vapor brush which extends around the entire edge of the armature can collect a large amount of current without using a current density of more than four amperes per square inch for the mercury vapor. The current jumps, via the mercury vapor brush, to the mercury 10 and then passes to the field winding 7. The negative circuit is from lead 8 to bus-bar 31, sleeve or tube 27, mercury column 29, spindle 23, armature 21, peripheral portion 21ª, back to mercury 10.

When the generator is started, the high initial resistance of the mercury vapor brush must be broken down. This can be done by speeding up the pump 12 so that the metallic mercury will actually strike the exposed peripheral portion 21ª of the armature, thus starting a mercury vapor arc across the vapor gap.

When the turbine is stopped and the condenser shut down, the turbine casing 1 will lose its vacuum and the mercury of the seal 26, 29, will be drawn up into the generator casing 2, causing the generator casing 2 to lose its vacuum. When the turbine is again started, the mercury will be drawn at once into the vessel 25 and a vacuum equal to the turbine vacuum will be maintained in the generator casing 2. The action of the pump 14 augments the vacuum.

Instead of locating the tube 11 as shown, it may be disposed at a point distant from the funnel 13 say, for instance, on the opposite side of the trough or collector ring 9 so that the mercury 10 will be constantly changing and can be carried away and cooled when it has become heated by the passage of the current through it.

In the form of the invention disclosed, where a continuous, annular portion or collector ring 9 is employed, it is necessary to maintain the machine in a level, or approximately level position. It is within the scope of my invention to construct the trough or ring 9 in sections, each having its separate spout 16. This would permit a considerable inclination of the machine from a horizontal position and would enable the generator to be used on board ship, or a moving train, or on any vehicle.

Other modifications could be resorted to within the scope and spirit of the invention.

I employ a condenser 32 which may comprise an annular pipe supplied with cold water and located inside the space 5 to maintain the proper vacuum in said space 5. There is an optimum pressure at which the mercury will offer the least resistance to the passage of an electric current. This pressure is about 1 mm. of mercury. The pressure in space 5 will vary, increasing with the temperature, and I regulate the temperature within space 5 by varying the supply of circulating water to the condenser. Condensed mercury falls from the surface 32 into the bottom of space 5 and drains into the funnel or mouth 13, which should be flush with the bottom.

Except where specifically included in the claims, I do not limit myself to mercury vapor for collecting the current, as other vapors or gases, particularly rarefied gas, might be used for that purpose in carrying out my invention.

Having thus described my invention, what I claim as new and desire to secure by Letters Patent, is:

1. In an electric generator, the combination with a field magnet and an armature which are relatively rotatable, of a vapor or gas collector or brush for taking off the current.

2. In an electric generator, the combination with a field magnet and an armature which are relatively rotatable whose active polar portions are subject to vacuum, of a vapor or gas collector or brush for taking off the current.

3. In an electric generator, the combination with a field magnet and an armature which are relatively rotatable whose active polar portions are subject to vacuum, of a vaporizable fluid exposed to the rotatable element aforesaid adapted, when subject to the vacuum, to provide a vapor brush or current collector.

4. In an electric generator, the combination with a field magnet and an armature which are relatively rotatable whose active polar portions are subject to vacuum, of a vaporizable fluid exposed to the rotatable element aforesaid adapted, when subject to the vacuum, to provide a vapor brush or current collector, and means for circulating said fluid.

5. In an electric generator, the combination with a field magnet and an armature which are relatively rotatable whose active polar portions are subject to vacuum, of a vaporizable fluid exposed to the rotatable element aforesaid adapted, when subject to the vacuum, to provide a vapor brush or current collector, and means for withdrawing said fluid, with its entrained gas, releasing the gas therefrom, and returning the fluid to its effective position.

6. In an electric generator, the combination with a field magnet and an armature which are relatively rotatable, of a mercury vapor collector or brush for taking off the current.

7. In an electric generator, the combination with a field magnet and an armature which are relatively rotatable whose active polar portions are subject to vacuum, of liquid mercury exposed to the rotatable element aforesaid adapted, when subject to the vacuum, to provide a mercury vapor brush or current collector.

8. In an electric generator, the combination with a field magnet and an armature which are relatively rotatable whose active polar portions are subject to vacuum, of liquid mercury exposed to the rotatable element aforesaid adapted, when subject to the vacuum, to provide a mercury vapor brush or current collector, and means for withdrawing the mercury, with its entrained gas, releasing the gas therefrom, and returning the mercury to its effective position.

9. In an electric generator, the combination with a field magnet and an armature which are relatively rotatable whose active polar portions are subject to vacuum, of liquid mercury exposed to the rotatable element aforesaid adapted, when subject to the vacuum, to provide a mercury vapor brush or current collector, and a vacuum pump which converts the mercury into a vapor brush or current collector, withdraws it with its entrained gas, releases the gas therefrom and returns it to effective position.

10. In an electric generator, the combination with a field magnet and a rotor, of a mercury vapor collector or brush interposed between substantially the entire periphery of the rotor and the field magnet for taking off the current.

11. In an electric generator, the combination with a field magnet and a rotor, of liquid mercury disposed adjacent substantially the entire periphery of the rotor, and means for subjecting the mercury to a vacuum to produce a peripheral brush or collector for transmitting current from the armature or rotor to the mercury.

12. A turbo-generator comprising connected turbine and generator casings, the latter having a field magnet, a rotor operating in the turbine casing, an armature rotatable in the generator casing and having its periphery adjacent the field magnet, a common spindle for said rotor and armature, means for producing vacuum in the generator casing, a mercury vapor collector or brush for taking off the current from the armature, and a mercury seal for said spindle and casings where the spindle passes through from one casing to the other.

13. In an electric generator, the combination with a field magnet and an armature which are relatively rotatable, of a vapor or gas collector or brush for taking off the current, and means for regulating the temperature of the vapor or gas to minimize the electrical resistance thereof.

14. In an electric generator, the combination with a field magnet and an armature which are relatively rotatable, of a vapor or gas collector or brush for taking off the current, and means for regulating the pressure of the vapor or gas to minimize the electrical resistance thereof.

15. In an electric generator, the combination with a field magent and an armature which are relatively rotatable, of a vapor or gas collector or brush for taking off the current, and means for condensing the vapor or gas.

16. In an electric generator, the combination with a field magnet and an armature which are relatively rotatable, of a mercury vapor collector or brush for taking off the current, and means for condensing the mercury vapor.

17. In an electric generator, the combination with a field magnet and an armature which are relatively rotatable whose active polar portions are subject to vacuum, of liquid mercury exposed to the rotatable element aforesaid adapted, when subject to the vacuum, to provide a mercury vapor brush or current collector, and means for condensing the mercury vapor.

In testimony whereof, I hereunto affix my signature.

ARTHUR S. DYSART.

Copies of this patent may be obtained for five cents each, by addressing the "Commissioner of Patents, Washington, D. C."